Jan. 5, 1943.   C. J. MALHIOT   2,307,415
FEED MECHANISM
Filed Feb. 3, 1940   3 Sheets-Sheet 2
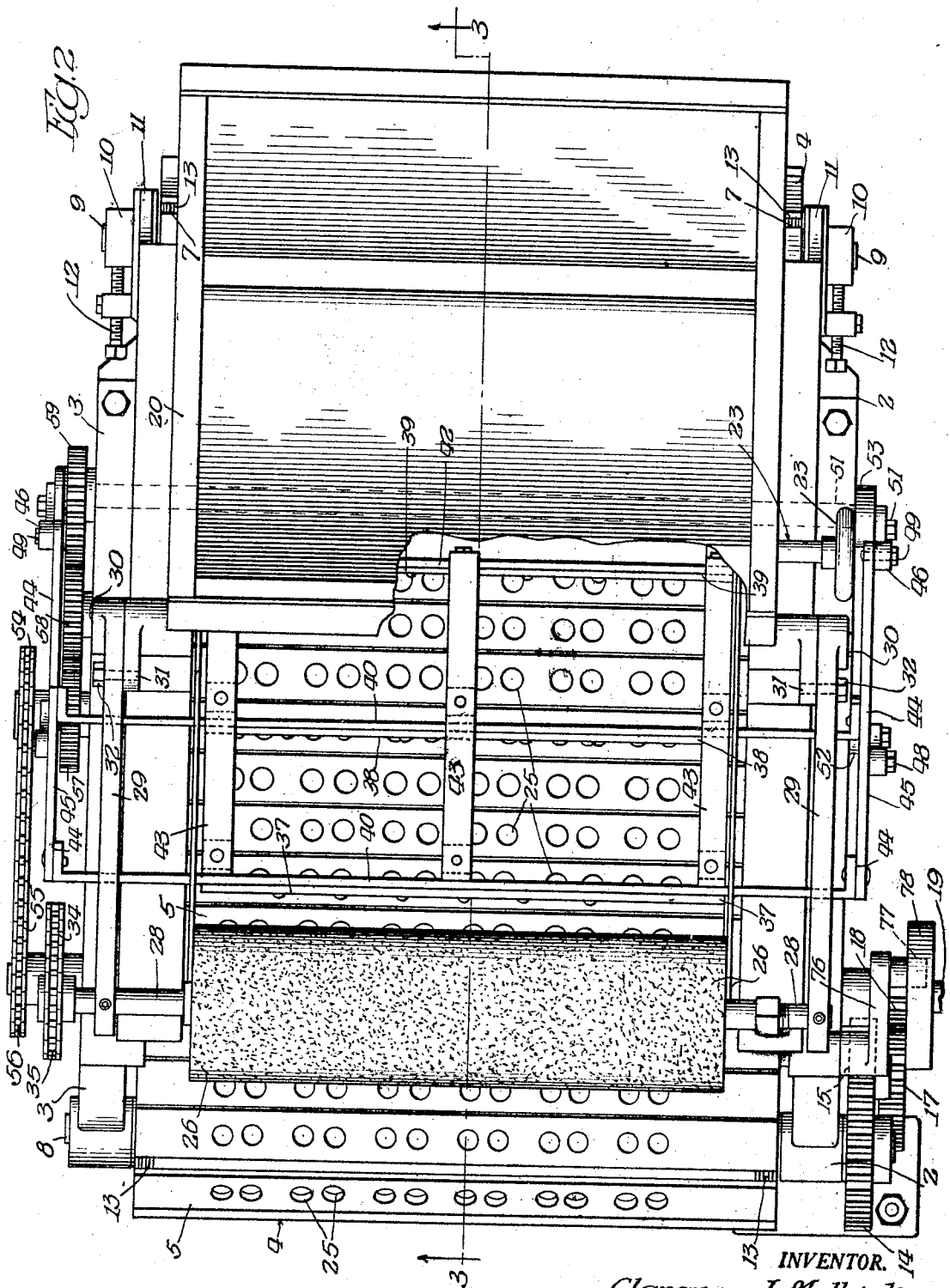
INVENTOR.
Clarence J. Malhiot.
By John A. Marzall ATTORNEY Jan. 5, 1943.　　　　C. J. MALHIOT　　　　2,307,415
FEED MECHANISM
Filed Feb. 3, 1940　　　　3 Sheets-Sheet 3
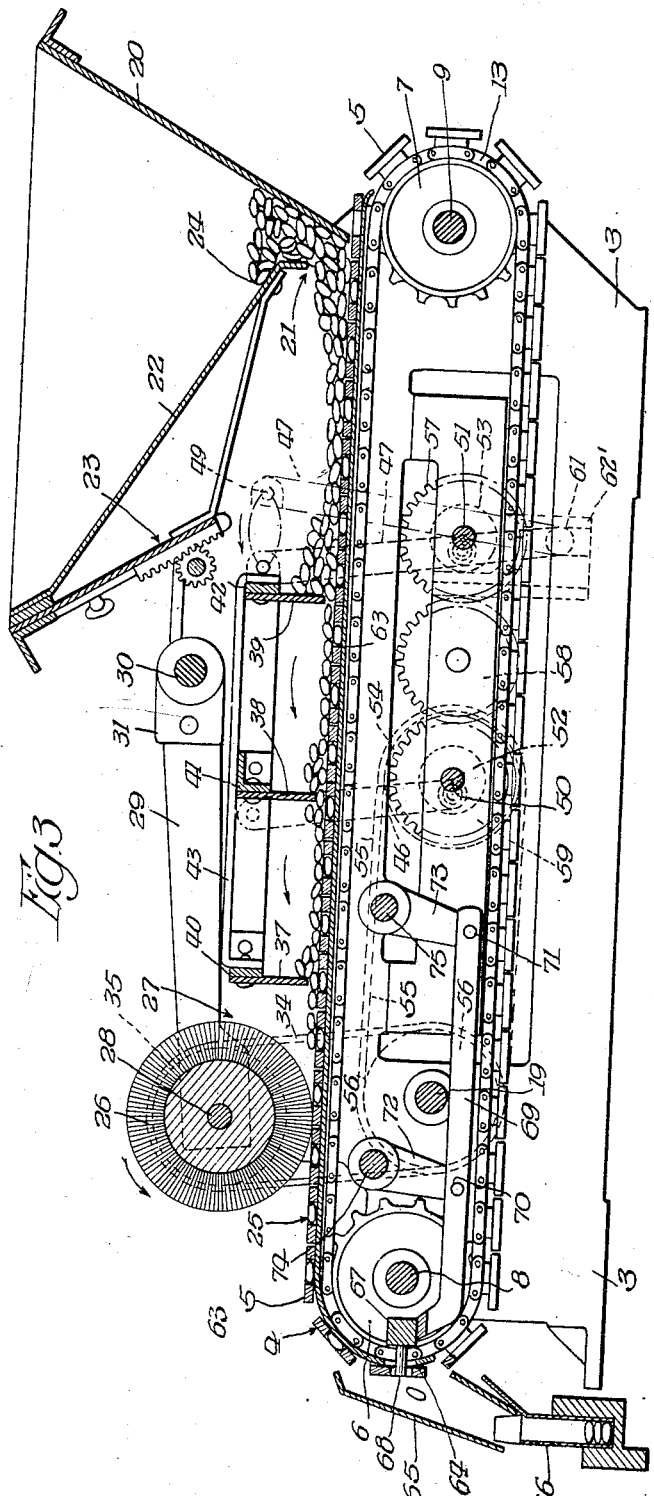
INVENTOR.
Clarence J. Malhiot
By John A. Marzall ATTORNEY Patented Jan. 5, 1943

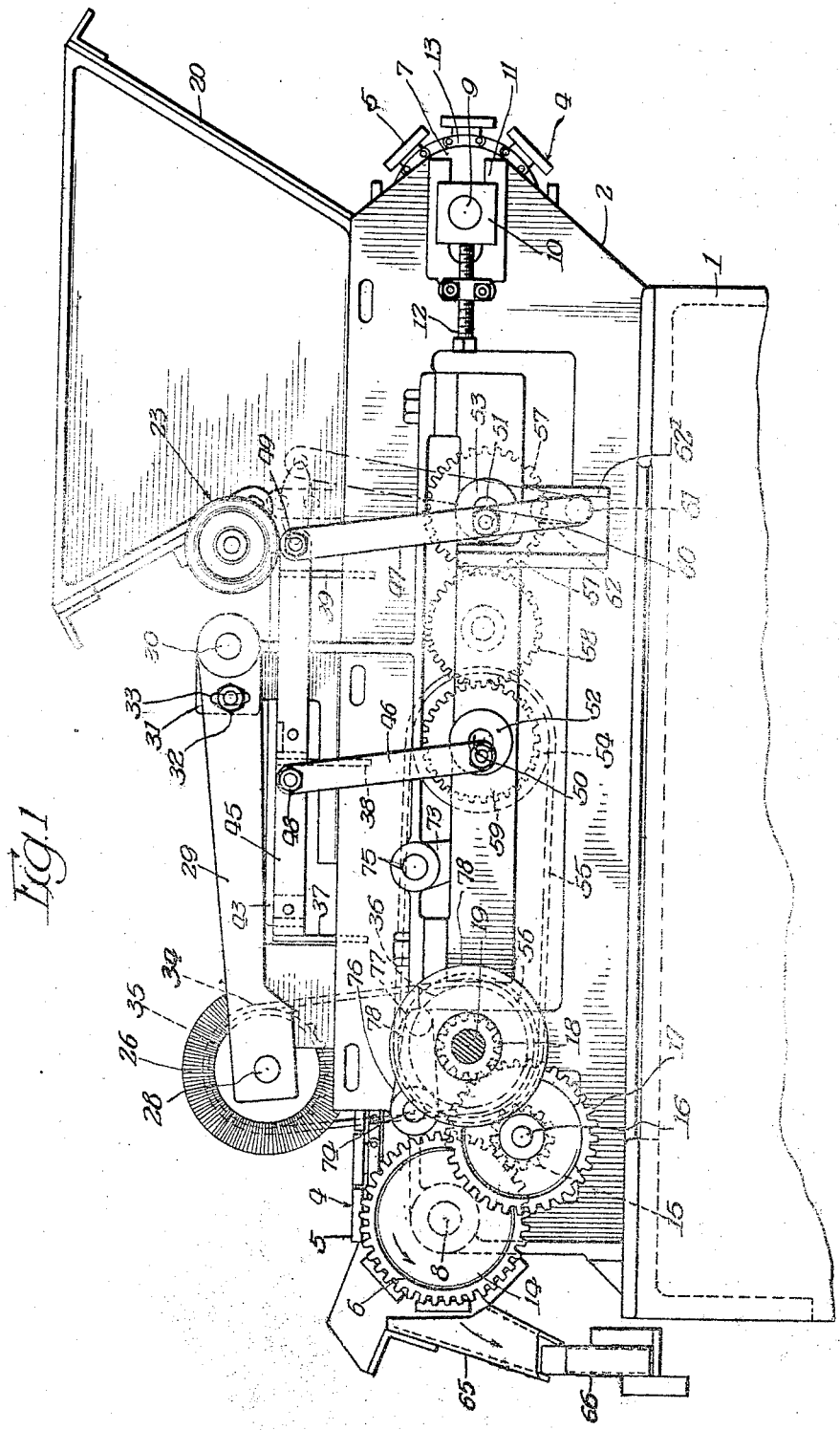

2,307,415

UNITED STATES PATENT OFFICE 2,307,415

FEED MECHANISM

Clarence J. Malhiot, Oak Park, Ill., assignor to F. B. Redington Co., Chicago, Ill., a corporation of Illinois Application February 3, 1940, Serial No. 317,123

11 Claims. (Cl. 198—30)

This invention relates to feeding mechanism and particularly to mechanism for feeding a predetermined number of articles, particularly in tablet form such as cough drops and the like, to a predetermined position, and then discharged into separate receptacles or packages.

An important object of the present invention is the provision of feeding means including a fast moving continuous or endless conveyor for feeding and counting articles to be packed continuously to a predetermined position at a relatively high speed.

Another object of the invention is the provision of continuously moving fast speed feeding and counting conveying mechanism which includes a plurality of transverse slotted strips or bars provided with receiving openings therein into which articles fed are positioned, there being means provided to allow a sufficient quantity of articles to be arranged on the conveyor to insure sufficient articles on the conveyor to permit proper feeding of the articles and at the same time remove a predetermined excess of articles away from feeding direction so that too many articles will not be piled on the conveyor to interfere with the proper operation of the machine.

A further object of the invention is the provision of feed means including a plurality of connected transverse slotted strips forming a continuous conveyor, and means for insuring the proper feeding of the material in the slots in strips, there also being new and improved means provided for ejecting the articles from the slots after the strips have attained a predetermined position.

A still further object of the invention lies in the provision of high speed feeding and counting means including a plurality of strips having openings therethrough into which the material to be packed is fed and received and delivered continuously to a predetermined position. Ejector mechanism operating in timed relationship with the speed of the conveyor strips is provided so that when the loaded conveyor strips reach a predetermined position the ejector mechanism will cause certain parts thereof to extend into the openings and eject the articles into a chute or chutes leading to a row of cartons into which the articles are packed.

A still further object of the invention is the provision of a machine of the class described which is provided with new and improved means for controlling the distribution of the articles on the continuously moving conveyor; which prevents an overexcess of material from being fed out of the conveyor but insures a sufficient quantity on the conveyor to be properly distributed in the openings provided in the conveyor, and which will prevent too many articles from assuming a predetermined position to clog parts of the apparatus.

Numerous other objects and advantages will be apparent throughout the progress of the following specification.

The accompanying drawings illustrate a selected embodiment of the invention and the views therein are as follows:

Fig. 1 is a detail elevational view of a feeding and counting machine and embodying the invention;

Fig. 2 is a top plan view thereof, parts being broken away for the sake of clearness;

Fig. 3 is a detail sectional view on the line 3—3 of Fig. 2 showing agitating mechanism in its extreme forward position;

Fig. 4 is a detail sectional view similar to Fig. 3 but showing the agitating mechanism in its extreme rearward position.

The apparatus herein shown for the purpose of illustrating the invention comprises a suitable frame or supporting base 1 upon which there are rigidly connected opposing side frame members 2 and 3. A conveyor 4 comprising a plurality of transverse strips 5 is operatively positioned between the side members 2 and 3 and is operatively engaged with sprockets 6 and 7 engageable with a pair of chains 13 upon which the transverse strips 5 are operatively connected. The sprockets 6 and 7 are operatively mounted on shafts 8 and 9 respectively, and these shafts are properly journaled in bearings in side frame members 2 and 3. The shaft 9, Figs. 1 and 2, is adapted for longitudinal adjustment, as the bearings 10 for this shaft are mounted in guideways 11 in the walls 2 and 3. Threaded means 12 are provided to effect adjustment of the shaft 9 so as to permit tightening or loosening of the conveyor chains 13, Fig. 1. The sprockets 7 are idler sprockets, while the sprockets 6 are the driving sprockets. The sprockets 6 are fixed to the transverse shaft 8 and this shaft carries a gear 14, Figs. 1 and 2, which meshes with an idler pinion 15 mounted on an idler stud 16. The idler stud 16 also carries a gear 17 which is rigidly connected to the pinion 15. The gear 17 has meshing relationship with a gear 18 fixed to the main driving shaft 19 which is suitably mounted in bearings provided in the side frames 2 and 3. The shaft 19 is the driving shaft and is operatively driven by any suitable means, such as by a sprocket and chain driven by a motor not shown, Fig. 2.

A hopper 20 is provided at the rear end of the machine to feed articles on the fast moving continuously operating endless belt 4. This hopper is provided with a feed mouth 21 through which the articles pass, there being a plate 22 operated by mechanism indicated generally by the numeral 23 to adjust the size of the feed mouth 21. However, even though the size of the feed mouth 21 may be varied, sufficient articles 24 in the hopper must be fed to the conveyor 4 so as to definitely insure every opening 25 provided in the strips 5 being filled with an article. A quantity of articles in excess of the amount required is, therefore, fed out of the mouth 21. A rotary brush 26 is provided to sweep the articles rearwardly against the forward travel of the conveyor so as to redistribute the articles rearwardly and cause the openings 25 to be definitely filled. Inasmuch as the amount of articles 24 fed is greater than the amount actually required to fill the openings 25, it has been found that the articles will pile up immediately rearwardly of the brush at the point indicated at 27, Figs. 3 and 4. The excess piling up of the articles rearwardly of the brush tends to overflow the brush and prevent proper operation thereof, as well as preventing proper distribution of the articles with respect to the openings in the transverse members 5.

The brush 26 is rigidly mounted on a transverse shaft 28, the ends of which are journaled on spaced supporting arms 29. The arms are pivotally mounted on studs 30 carried by the side frames 2 and 3. The inner surfaces of the arms 29 abut extension lugs 31 fixed to the side frames 2 and 3. Locking bolts 32 extend through slotted openings 33, Fig. 1, formed in arms 29 and threadedly engage the lugs 31. This arrangement permits for limited vertical adjustment of the brush, and to permit accurate spacing between the bottom of the brush and the top of the conveyor. The brush 26 is adapted to be rotated by a sprocket chain 34 engaging a sprocket 35 fixed to the brush shaft 28. The sprocket chain 34 is driven by a sprocket wheel 36 fixed to the transverse shaft 19. Inasmuch as the articles tend to overflow the brush and prevent proper redistribution of the articles along the conveyor, means are provided to periodically or intermittently engage the articles piled up rearwardly of the brush to move them rearwardly toward the hopper and redistribute them properly along the top surface of the conveyor. Means for effecting the removement or redistribution of the articles comprises a plurality of transverse agitating blades 37, 38 and 39 which travel in an elliptical path.

The flexible agitating blades 37, 38 and 39 are fixed to transverse bars or rods 40, 41 and 42 respectively. These rods are interconnected at their upper ends by suitable longitudinally extending carrier or supporting members 43. The rods or bars 40 and 41 extend a predetermined distance beyond the side supporting frames 2 and 3 while the connecting rod 42 terminates within the inner side walls of the side frames 2 and 3. The projecting ends of the rods or bars 40 and 41 are fixed as indicated at 44 to longitudinally extending side members 45. Downwardly extending supported link members 46 and 47 are pivotally connected at 48 and 49 to the side members 45. The lower ends of the links 46 and 47 are pivotally connected to the crank pins 50 and 51, eccentrically mounted with respect to transverse driving shafts 52 and 53. The shaft 52 carries a sprocket wheel 54 and is driven by a sprocket chain 55 from a sprocket 56 on the shaft 19. The shaft 53 is driven by a gear 57 which meshes with an idler gear 58 which in turn meshes with a gear 59 on the shaft 52. The operating links 47 are provided with extensions 60 upon which are mounted at the lower ends thereof rollers 61 operating in vertical guideways 62 in bracket 62'.

The agitating blades 37, 38 and 39 through the mechanism just described are caused to move in an orbit or ellipse. The movement of this agitating structure is such that the horizontal movement of the ellipse or orbit is greater than the vertical travel. Therefore, during operation, the blades are first caused to rise and then move forward, where they engage any surplus of articles which may be piled up behind the brush. Any surplus so piled up is engaged by the blades as they move downwardly and pushed rearwardly by the blades in their rearward travel to overcome the piling up to too great an extent at the back of the brush. The blades, in moving surplus articles rearward, redistribute the articles and fill any voids 25 in the strips 5. The rearmost blade also has the tendency of preventing too many articles from coming out of the mouth or throat 21 of the hopper, and therefore tends to regulate the flow of the articles out of the hopper. The agitating mechanism first rises and then moves forwardly. After this mechanism has moved to the forward extent of its travel, it then moves downwardly to engage the pile of articles, and after such engagement moves rearwardly to cause redistribution of the articles.

The brush 26, as well as tending to brush back the articles on the conveyor, has for its main purpose the object of causing the articles to be positioned in the openings 25 in the transverse strips which constitute the operating surface of the conveyor. The articles, after they are positioned in the openings, are prevented from falling completely through the openings provided in the strips because a bottom supporting plate 63 is arranged immediately below the under surface of the conveyor. Therefore, as the articles are forced into the openings 25 they are caused to be moved along by the conveyor by sliding along the top of the shelf supporting member or surface 63. The member 63 extends forwardly from a point rearwardly of the hopper to a point indicated at 64, Fig. 3. The forward end of the member 63 is provided with spaced openings spaced a distance apart equal to the distance the openings 25 are spaced in the members 5.

As the members 5 are moved forwardly by the operation of the conveyor, the articles 24 become positioned in each one of the slots 25 in the successive members 5. The articles 24 are adapted finally to be deposited in one or more chutes 65 which lead to a plurality of containers 66 into which the articles are packaged. However, to insure that every article in every opening 25 is discharged into the chute 65, ejecting means are provided. The ejecting means comprises an elongated transverse bar 67 arranged beneath the conveyor and extending a distance equal to the width of the conveyor. The member 67 is provided with a plurality of fingers 68, the number of fingers 68 being the same as the number of openings 25 in the transverse strips 5. These fingers are adapted to extend through the openings in the plate supporting member 63 and be passed through the spaced openings 25 in the members 5 so as to definitely and positively cause the articles to be ejected out of the openings and deposited into the chute. The transverse bar 67 has its ends supported by side bars 69 which are pivotally connected at 70 and 71 to lever arms 72 and 73. The lever arms 72 are mounted on a transverse shaft 74 which extends across the full width of the machine being mounted in bearings in the side frames 2 and 3. The rear lever arms 73 are mounted on individual studs 75 on the side frame walls 2 and 3. A cam arm 76 is rigidly connected to the shaft 74 and carries a cam roller 77 which is adapted to engage a camway in the cam 78, the cam 78 being rigidly secured to and driven by the shaft 19. The rotation of the cam 78 is correlated and synchronized with the speed movement of the conveyor so that the cam will cause the bar 67 to be moved forwardly and register with the openings in a transverse strip 5 so as to eject the articles in the openings 25. The operation of the cam is such that this ejecting motion occurs every time a strip 5 comes into position, whereby the fingers 68 will protrude through the openings 25 and eject any articles which have not previously fallen out therefrom and deposited in the chute 65.

The invention provides a machine or mechanism which comprises a fast moving, continuously rotating conveyor which is provided with longitudinelly spaced rows of openings into which the articles from the hopper are finally fed. The feed from the hopper is regulated by mechanical means as well as by the agitating means which also assist in preventing the articles from piling up behind the brush and causes the articles to be redistributed so that definitely there will be an article in each hole in each of the cross strips 5 after the strips leave from under the brush 26. The device is rigid and durable in construction, efficient in operation and can be readily and economically installed and applied. The parts are correlated and synchronized so that the parts all work and operate harmoniously together and assure for positive operation.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. Feed mechanism comprising an endless conveyor provided with article receiving openings, feeds means for feeding articles to the conveyor, distributing means for distributing articles into said openings and preventing articles not in the openings from passing beyond the distributing means, an article translating member arranged between said feed means and said distributing means to redistribute articles along the conveyor and move the articles away from said distributing means, means including a movable member connected with said translating member for movably supporting the translating member, and means for imparting a rake-like movement to said translating member including means for moving said supporting member to-and-fro with respect to said distributing means and said feed means to bodily move the translating member along a path substantially parallel with the direction of movement of the conveyor, and means for effecting lifting and lowering of said supporting member at its connection with said translating member to lift and lower the entire translating member with respect to said conveyor.

2. Feed mechanism comprising an endless conveyor provided with article receiving openings, feed means for feeding articles to the conveyor, distributing means for distributing articles into said openings and preventing articles not in the openings from passing beyond the distributing means, an article translating member arranged between said feed means and said distributing means to redistribute articles along the conveyor and move the articles away from said distributing means, means including a movable member connected with said translating member for movably supporting the translating member, and means for moving said connection in a substantially orbital path to impart a rake-like movement to said translating member including means for moving said supporting member to-and-fro with respect to said distributing means and said feed means to bodily move the translating member along a path substantially parallel with the direction of movement of the conveyor, and means for effecting lifting and lowering of said supporting member at its connection with said translating member simultaneously with said to-and-fro movement to lift and lower the entire translating member with respect to said conveyor.

3. Feed mechanism for articles comprising spaced strips each provided with a predetermined number of openings therein and connected together to form an endless conveyor, instrumentalities for operating said conveyor, means mounted adjacent the upper face of the conveyor to cause the articles to be received in the openings and to prevent surplus articles and articles not in the openings from passing beyond said means, and means for redistributing articles along the conveyor and away from said means, comprising a plurality of transverse flexible agitating strips extending across the conveyor, means operatively connecting said strips, and means for imparting simultaneous orbital movement to all of said strips and of such character that each part of each strip is carried in a respective orbital path in a plane disposed substantially normal to the carrying force of said conveyor and parallel with the direction of travel of said conveyor, and the direction of said movement being such that said strips are carried oppositely to the direction of conveyor movement while traversing that portion of their orbital paths nearest to the conveyor.

4. Feed mechanism for articles comprising spaced strips each provided with a predetermined number of openings therein and connected together to form an endless conveyor, instrumentalities for operating said conveyor, means mounted adjacent the upper face of the conveyor to cause the articles to be received in the openings and to prevent surplus articles and articles not in the openings from passing beyond said means, and means for redistributing articles along the conveyor and away from said means, comprising a plurality of transverse flexible actuating strips extending across the conveyor, means operatively connecting said strips, an arm for operating said strips, an eccentric upon which said arm is pivoted, a roller on said arm, a guide in which said roller is received for guiding said roller in a path that is substantially perpendicular with respect to the carrying face of said conveyor, and means to rotate said eccentric about an axis directed transversely of said conveyor whereby said strips will have imparted thereto by said arm an orbital movement of such character that each part of each strip is carried in a respective orbital path in a plane disposed substantially normally to the carrying face of said conveyor and parallel with the direction of travel of said conveyor, and the direction of said movement being such that said strips are carried oppositely to the direction of conveyor movement while traversing that portion of their orbital paths nearest to the conveyor.

5. Feed mechanism comprising an endless conveyor provided with openings therein, means for moving the conveyor, means for feeding articles to the conveyor, means for distributing the articles along the conveyor so that they may be receivable in the openings, means for redistributing the articles along the conveyor, and operative means for moving said last named means in the direction of movement of the conveyor, means for elevating the operative means during said movement, means for reversing the travel of the operative means in a direction opposite to the travel of the conveyor, and means for lowering the said operative means during said reverse travel.

6. Feed mechanism comprising an endless conveyor provided with article receiving openings, feed means for feeding articles to the conveyor, distributing means for distributing articles into said openings and preventing articles not in the openings from passing beyond the distributing means, an article translating member arranged between said feed means and said distributing means to redistribute articles along the conveyor and move surplus articles away from said distributing means, and means for imparting substantially elliptical orbital movement to said translating member including means for lowering the member to a position adjacent the conveyor and bodily moving all parts of the member rearwardly to move articles towards the feed means, and means for raising the member above articles on the conveyor and bodily moving the member forwardly towards the distributing means.

7. Feed mechanism comprising an endless conveyor provided with article receiving openings, feed means for feeding articles to the conveyor, distributing means for distributing articles into said openings and preventing articles not in the openings from passing beyond the distributing means, an article translating member arranged between said feed means and said distributing means to redistribute articles along the conveyor and move surplus articles away from said distributing means, and means for imparting substantially elliptical orbital movement to said translating member including means for lowering the member to a position adjacent the conveyor and bodily moving all parts of the member rearwardly to move articles towards the feed means, and means for raising the member substantially out of contact with articles on the conveyor and bodily moving the member forwardly towards the distributing means, said translating member thereby having a rake-like action providing for moving articles substantially solely in a direction away from the distributing means.

8. Feed mechanism comprising a continuously moving endless conveyor provided with openings therein, feed means for feeding articles to the conveyor, distributing means for sweeping the articles rearwardly toward the feed means, article redistributing means arranged between the feed means and the distributing means, an arm pivotally connected to the redistributing means, an eccentric upon which the arm is pivotally mounted, an extension on the arm, a roller on the extension, a guideway in which the roller is guided, and means for rotating the eccentric, whereby the redistributing means is moved in an orbit.

9. Feed mechanism comprising a continuously moving endless conveyor provided with openings therein, feed means for feeding articles to the conveyor, distributing means for sweeping the articles rearwardly toward the feed means, a plurality of flexible strips extending across the conveyor, means connecting the strips together, and means for operating all the strips simultaneously in an elliptical orbit, said last named means including an eccentric, an arm pivoted to the eccentric and driven thereby, a roller on the arm, and a guide in which said roller operates.

10. In a device of the class described comprising a plurality of transverse flexible members, a support for said members, and means for moving said members through a substantially elliptical orbit including an arm having its upper end pivotally connected to a part of the support, a roller mounted on the lower end of the arm, a guideway in which the roller operates, an eccentric to which the arm is pivotally connected intermediate its ends, and means to drive the eccentric.

11. Feed mechanism comprising a continuously moving endless conveyor provided with openings therein, feed means for feeding articles to the conveyor, distributing means for sweeping the articles rearwardly toward the feed means, and means operative substantially solely in one direction for redistributing said articles along the conveyor and rearwardly from said distributing means comprising a plurality of transversely arranged article translating members, means supporting each of said translating members for movement through substantially orbital paths providing for bodily moving all parts of the members rearwardly while in a lowered position adjacent said conveyor to move articles towards the feed means and for bodily moving all parts of the members forwardly towards the distributing means while in an elevated position above articles on the conveyor, and drive means for moving each of the members through said orbital paths.

CLARENCE J. MALHIOT.